US006785086B1

(12) United States Patent
Bonin et al.

(10) Patent No.: US 6,785,086 B1
(45) Date of Patent: Aug. 31, 2004

(54) TRANSDUCER-LEVEL MICROACTUATOR WITH DUAL-AXIS CONTROL

(75) Inventors: Wayne A. Bonin, North Oaks, MN (US); Zine-Eddine Boutaghou, Vadnais Heights, MN (US); Roger L. Hipwell, Jr., Eden Prairie, MN (US); Barry D. Wissman, Ann Arbor, MI (US); Lee Walter, Plymouth, MN (US); Barbara J. Ihlow-Mahrer, Crystal, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 308 days.

(21) Appl. No.: 09/815,679

(22) Filed: Mar. 23, 2001

Related U.S. Application Data

(60) Provisional application No. 60/194,806, filed on Apr. 5, 2000.

(51) Int. Cl.[7] ............................................. G11B 5/596
(52) U.S. Cl. ................................ 360/78.05; 360/78.12
(58) Field of Search ............................. 360/75, 78.05, 360/78.12, 294.1, 294.7, 264.5; 310/309; 345/716; 711/112

(56) References Cited

U.S. PATENT DOCUMENTS

| | | | |
|---|---|---|---|
| 3,924,268 A | 12/1975 | McIntosh et al. | 360/78 |
| 4,374,402 A | 2/1983 | Blessom et al. | 360/104 |
| 4,652,242 A | 3/1987 | Hirano et al. | 360/103 |
| 4,764,829 A | 8/1988 | Makino | 360/106 |
| 4,914,725 A | 4/1990 | Belser et al. | 318/560 |
| 5,021,906 A | 6/1991 | Chang et al. | 360/103 |
| 5,034,828 A | 7/1991 | Ananth et al. | 360/75 |
| 5,055,731 A | * 10/1991 | Nihei et al. | 310/309 |
| 5,177,652 A | 1/1993 | Yamaguchi et al. | 360/78.05 |
| 5,189,578 A | 2/1993 | Mori et al. | 360/106 |
| 5,303,105 A | 4/1994 | Jorgenson | 360/106 |
| 5,364,742 A | 11/1994 | Fan et al. | 430/317 |
| 5,375,033 A | 12/1994 | MacDonald | 361/281 |
| 5,521,778 A | 5/1996 | Boutaghou et al. | 360/106 |

(List continued on next page.)

FOREIGN PATENT DOCUMENTS

| | | | |
|---|---|---|---|
| EP | 0 412 221 B1 | 11/1989 | |
| JP | 63-122069 | 5/1988 | |
| JP | 02-263369 | 4/1989 | |
| JP | 04-134681 | 5/1992 | |
| JP | 04-368676 | 12/1992 | |
| JP | 05-094682 | 4/1993 | ........... G11B/21/21 |
| JP | 06-020412 | 1/1994 | |
| JP | 07-085621 | 3/1995 | ........... G11B/21/20 |

OTHER PUBLICATIONS

"Silicon Micromachined Electromagnetic Microactuators for Rigid Disk Drives" by Tanq et al, *IEEE Transactions on Magnetics*, vol. 31, No. 6, Nov. 1995.

(List continued on next page.)

*Primary Examiner*—David Hudspeth
*Assistant Examiner*—K. Wong
(74) *Attorney, Agent, or Firm*—Kinney & Lange, P.A.

(57) ABSTRACT

A slider for carrying and finely adjusting both a radial position and a flying height of a transducing head with respect to a track of a rotatable disc includes a stator portion carried by a support structure such as a flexure of a disc drive system. A plurality of springs extend from the stator portion and are flexible in a lateral direction (for radial positioning) and in a vertical direction (for flying height control). A rotor portion is connected to the stator portion by the plurality of springs. The rotor portion carries the transducing head. The stator portion includes a plurality of stator electrodes, and the rotor portion includes a plurality of rotor electrodes suspended between the stator electrodes. Selected voltages are applied to the stator electrodes and the rotor electrodes to create a selected force in the lateral and vertical directions for moving the rotor portion with respect to the stator portion to finely adjust the radial position and flying height of the transducing head.

15 Claims, 8 Drawing Sheets

U.S. PATENT DOCUMENTS

| | | | | |
|---|---|---|---|---|
| 5,657,188 | A | | 8/1997 | Jurgenson et al. .......... 360/106 |
| 5,745,319 | A | | 4/1998 | Takekado et al. ......... 360/78.05 |
| 5,764,444 | A | | 6/1998 | Imamura et al. ............ 360/109 |
| 5,781,381 | A | | 7/1998 | Koganezawa et al. ...... 360/106 |
| 5,796,558 | A | | 8/1998 | Hanrahan et al. ........... 360/106 |
| 5,801,472 | A | | 9/1998 | Wada et al. ................ 310/309 |
| 5,805,375 | A | | 9/1998 | Fan et al. ................ 360/78.12 |
| 5,856,896 | A | | 1/1999 | Berg et al. .................. 360/104 |
| 5,867,347 | A | | 2/1999 | Knight et al. ............... 360/104 |
| 5,896,246 | A | | 4/1999 | Budde et al. ............... 360/104 |
| 5,898,541 | A | | 4/1999 | Boutaghou et al. ......... 360/109 |
| 5,898,544 | A | | 4/1999 | Krinke et al. ............... 360/104 |
| 5,920,441 | A | | 7/1999 | Cunningham et al. ... 360/78.05 |
| 5,936,805 | A | | 8/1999 | Imaino ....................... 360/104 |
| 5,943,189 | A | * | 8/1999 | Boutaghou et al. ...... 360/234.7 |
| 5,959,808 | A | | 9/1999 | Fan et al. .................... 360/106 |
| 5,995,334 | A | | 11/1999 | Fan et al. |
| 5,998,906 | A | * | 12/1999 | Jerman et al. .............. 310/309 |
| 6,265,806 | B1 | * | 7/2001 | Suzuki ....................... 310/309 |
| 6,282,066 | B1 | * | 8/2001 | Bonin ..................... 360/294.1 |
| 6,360,035 | B1 | * | 3/2002 | Hurst, Jr. et al. ............. 385/18 |
| 6,472,794 | B1 | * | 10/2002 | Shibaike et al. ............ 310/309 |
| 6,590,748 | B2 | * | 7/2003 | Murphy et al. .......... 360/294.4 |

OTHER PUBLICATIONS

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

"A Flexural Piggyback Milli–Actuator for Over 5 Gbit/in$^2$ Density Magnetic Recording" by Koganezawa et al, *IEEE Transactions on Magnetics*, vol. 32, No. 5, Sep. 1996.

"Transverse Mode Electrostatic Microactuator for MEMS–Based HDD Slider" by Imamura et al, *IEEE* 1996.

"An Experiment for Head Positioning System Using Sub–micron Track–width GMR Head" by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advance Information Storage Systems*, vol. 5, pp. 119–125.

"A Dual–Stage Magnetic Disk Drive Actuator Using a Piezoelectric Device for a High Track Density" by Mori et al., *IEEE Transactions on Magnetics*, vol. 27, No. 6, Nov. 1991.

"Dynamic Loading Criteria for 3–½ Inch Inline HDD Using Multilayer Piezoelectric Load/Unload Mechanism" by Kajitani et al., *IEEE Transactions on Magnetics*, vol. 27, No. 6, Nov. 1991.

"Design, Fabrication, and Testing of Silicon Microgimbals for Super–Compact Rigid Disk Drives" by Temesvary et al., *Journal of Microelectromechanical Systems*, vol. 4, No. 1, Mar. 1995.

Hiroyuki Fujita, Kosei Suzuki, Manabu Ataka and Shigeo Nakamura; A Microactuator for Head Positioning System of Hard Disk Drives; 1999; pp. 1006–1010.

T. Hiran, T. Furuhata, K. J. Gabriel and H. Fujita; Operation of Sub–Micron Gap Electrostatic Comb–Drive Actuators; 1991; pp. 873–876.

* cited by examiner

TRANSDUCER-LEVEL MICROACTUATOR WITH DUAL-AXIS CONTROL

CROSS-REFERENCE TO RELATED APPLICATION(S)

This application claims priority from Provisional Application No. 60/194,806 filed Apr. 5, 2000 for "Transducer-Level Electrostatic Microactuator With Dual-Axis Control" by W. Bonin, Z. Boutaghou, R. Hipwell, Jr., B. Wissman, L. Walter and B. Ihlow-Mahrer.

Reference is also made to U.S. application Ser. No. 09/733,351 filed Dec. 8, 2000 for "Transducer-Level Microactuator for Precise Head Positioning" by W. Bonin, Z. Boutaghou, R. Hipwell, Jr., B. Wissman, L. Walter and B. Ihlow-Mahrer.

INCORPORATION BY REFERENCE

The aforementioned Provisional Application No. 60/194,806 and U.S. application Ser. No. 09/733,351 are hereby incorporated by reference in their entirety.

BACKGROUND OF THE INVENTION

The present invention relates to a disc drive microactuator, and more particularly to a high resolution positioning mechanism implemented at the transducer level for selectively moving a transducer portion of the slider radially with respect to circumferential data tracks of a rotatable disc.

The density of concentric data tracks on magnetic discs continues to increase (that is, the size of data tracks and radial spacing between data tracks are decreasing), requiring more precise radial positioning of the head. Conventionally, head positioning is accomplished by operating an actuator arm with a large-scale actuation motor, such as a voice coil motor, to radially position a head on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

Another challenge as the track density of magnetic discs increases is that the flying height of the transducing head above the surface of the disc must decrease for effective data writing and reading, without compromising the reliability of the head-to-disc interface due to wear. As the flying height becomes lower, it becomes more critical to maintain the flying height precisely at a desired value, since a slight decrease may cause contact between the head and the disc which could cause a catastrophic failure, and a slight increase during writing or reading could cause errors in the transducing of data with the disc.

One promising approach for high resolution head positioning involves employing a high resolution microactuator in addition to the conventional lower resolution actuator motor, thereby effecting head positioning through dual-stage actuation. Various microactuator designs have been considered to accomplish high resolution head positioning. Some designs are employed to deform disc drive components such as the actuator arm or the flexure in order to achieve minute displacements by bending. Other designs introduce a separate microactuator component at an interface between disc drive components. While many previous microactuator designs are able to deliver satisfactory micropositioning performance, their effectiveness is inherently limited by the sheer mass that the microactuators are designed to move. In order to move or bend one or more of the disc drive components, the microactuator employed must provide a relatively large amount of force, which requires either a complex or relatively massive microactuator motor mechanism.

A number of configurations have also been proposed to adjust the flying height of the head above the surface of the disc. Several of these proposed configurations employ an active deforming element such as a piezoelectric element to deform the slider itself, referred to in the art as "crown control." With cost being a prime consideration in the commercial viability of a disc drive, the economic feasibility of adding both a crown control microactuator and a head positioning microactuator is questionable. Crown control microactuators also have a frequency response that is limited by the time it takes for the air bearing pressure between the head-carrying slider and the disc to adjust to a new slider profile. This adjustment time is roughly equal to the length of the slider divided by the surface velocity of the disc, which is typically on the order of several tenths of a millisecond. Between the cost and frequency response concerns, the combination of a crown control microactuator and a head positioning microactuator does not represent an ideal solution for a high track density disc drive.

A microactuator designed to move only a transducer-carrying portion of the slider with respect to the main portion of the slider is disclosed in U.S. application Ser. No. 09/007,007 which is assigned to Seagate Technology, Inc., the same assignee as the present invention. The present invention provides another microactuator for moving a transducer-carrying portion of the slider with high resolution and frequency response, while also providing flying height adjustment capability in the same microactuator configuration. The microactuator of the present invention is readily and inexpensively manufacturable for economic feasibility.

BRIEF SUMMARY OF THE INVENTION

The present invention is a slider for carrying and finely adjusting both a radial position and a flying height of a transducing head with respect to a track of a rotatable disc. The slider includes a stator portion carried by a support structure such as a flexure of a disc drive system. A plurality of springs extend from the stator portion and are flexible in a lateral direction (for radial positioning) and in a vertical direction (for flying height control). A rotor portion is connected to the stator portion by the plurality of springs. The rotor portion carries the transducing head. The stator portion includes a plurality of stator electrodes, and the rotor portion includes a plurality of rotor electrodes suspended between the stator electrodes. Selected voltages are applied to the stator electrodes and the rotor electrodes to create a selected force in the lateral and vertical directions for moving the rotor portion with respect to the stator portion to finely adjust the radial position and flying height of the transducing head.

DETAILED DESCRIPTION OF THE PREFERRED EMBODIMENTS

Figure 1:
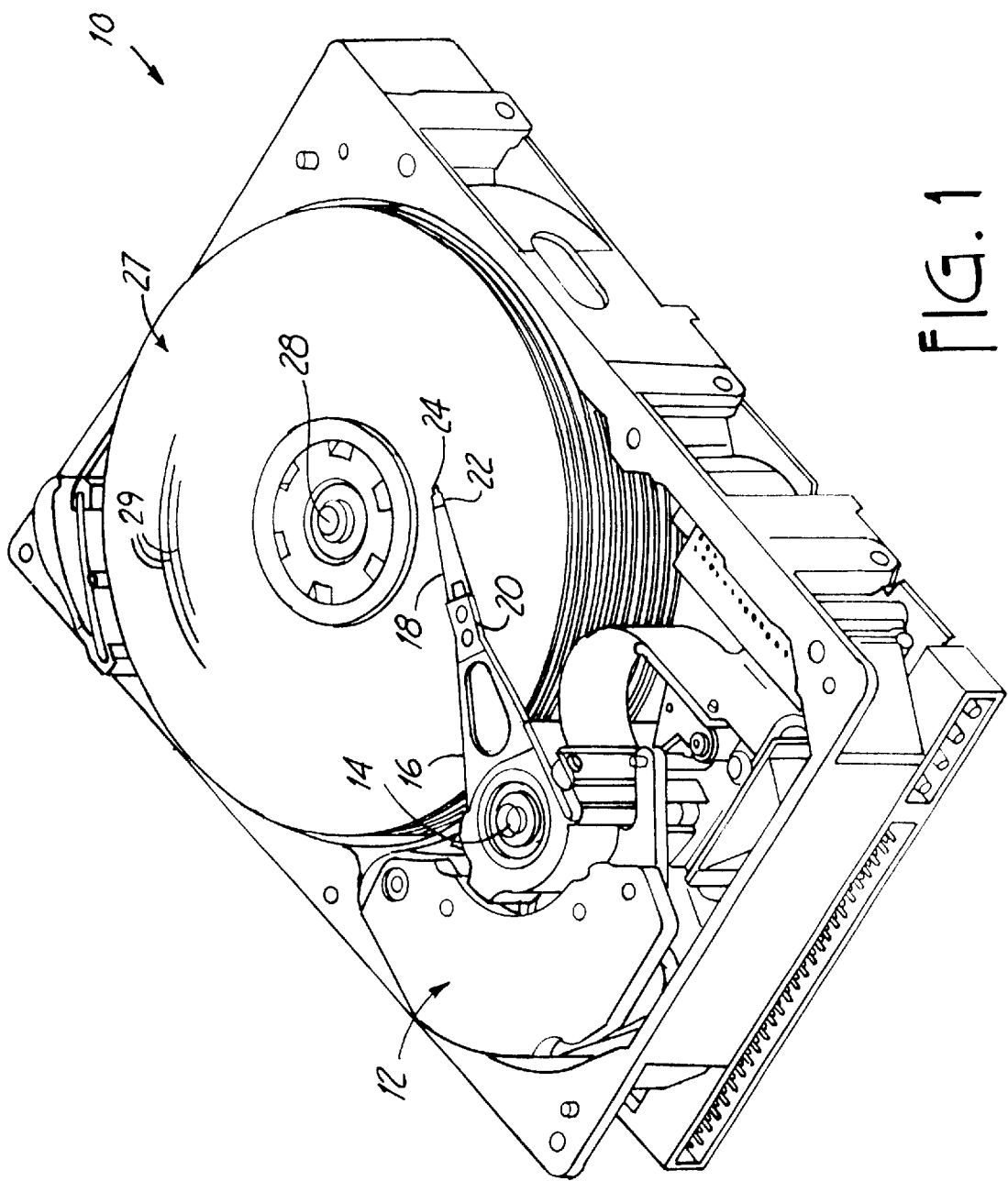
FIG. 1 is a perspective view of a prior art disc drive.

FIG. 1 is a perspective view of a prior art disc drive 10. Disc drive 10 includes voice coil motor (VCM) 12 arranged to rotate actuator arm 16 on a spindle around axis 14. Head suspension 18 is connected to actuator arm 16 at head mounting block 20. Flexure 22 is connected to an end of head suspension 18, and carries slider 24. Slider 24 carries a transducing head (not shown in FIG. 1) for reading and/or writing data on disc 27, which rotates around axis 28 and includes concentric tracks 29 on which the data is written. As disc 27 rotates, windage is encountered by slider 24 to keep it aloft a small distance above the surface of disc 27.

VCM 12 is selectively operated to move actuator arm 16 around axis 14, thereby moving slider 24 between tracks 29 of disc 27. However, for disc drive systems with high track density, VCM 12 lacks sufficient resolution and frequency response to position a transducing head on slider 24 precisely over a selected track of disc 27. Therefore, a higher resolution actuation device is necessary.

Figure 2:
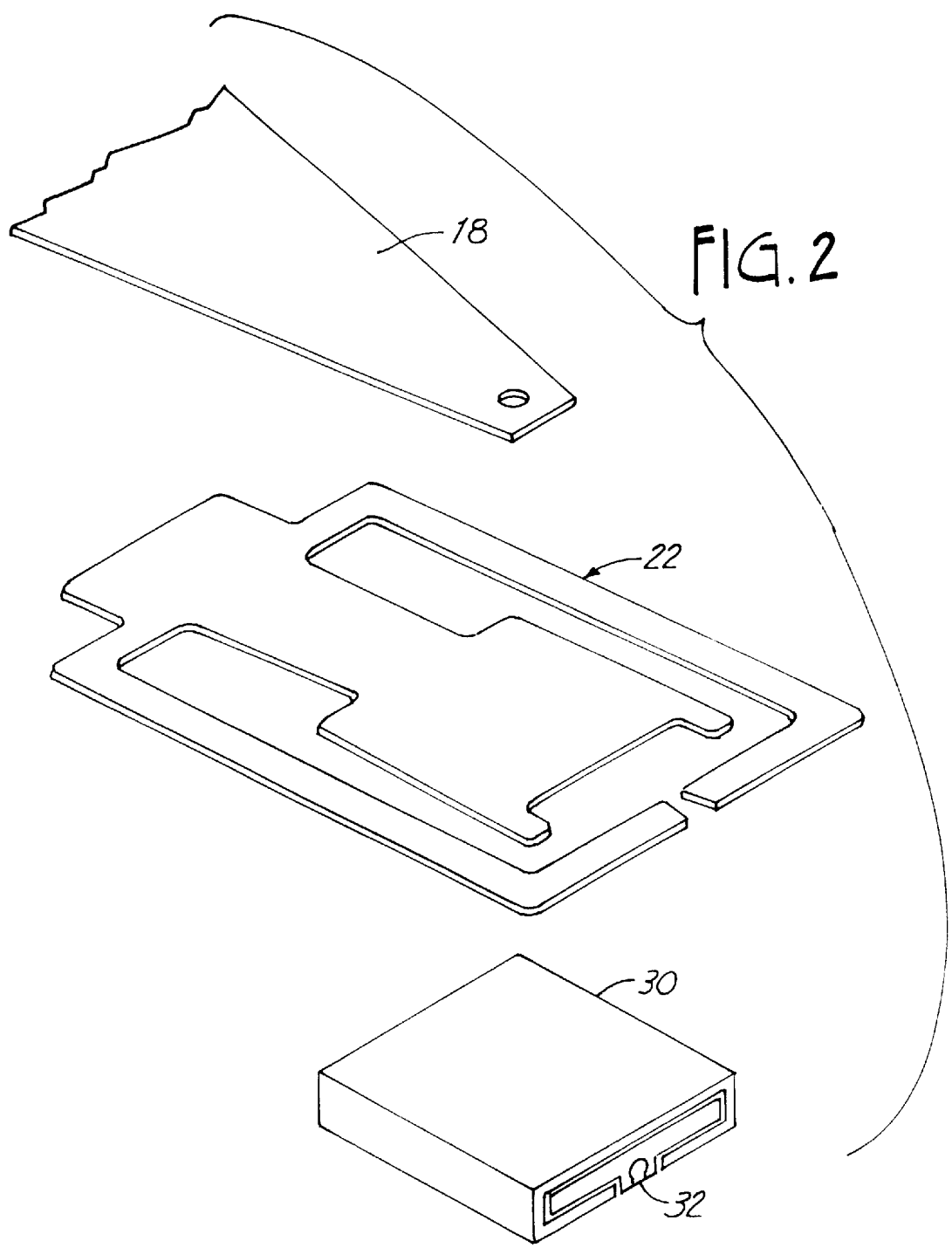
FIG. 2 is an exploded perspective view of a portion of a disc drive employing a slider assembly that includes a microactuator in accordance with the present invention.

FIG. 2 is an exploded perspective view of a portion of a disc drive that is similar to prior art disc drive 10 (FIG. 1), showing flexure 22 attached to suspension 18. Instead of employing a conventional slider such as slider 24 shown in FIG. 1, slider assembly 30 employing a microactuator according to the present invention is supported above a surface of disc 27 (FIG. 1) by flexure 22. Transducing head 32 is carried by slider assembly 30 to transduce data with the disc. In operation of the disc drive, suspension 18, flexure 22 and slider assembly 30 are all moved together as coarse positioning is performed by VCM 12 (FIG. 1) moving actuator arm 16 (FIG. 1) to which load beam 18 is attached. In order to perform fine positioning of transducing head 32, a head-carrying portion of slider assembly 30 is displaced relative to the main portion of slider assembly 30 by a microactuator device (not shown in FIG. 2). The fine positioning operation can therefore be performed with high resolution and frequency response. The detailed construction of slider assembly 30 employing a microactuator for achieving fine positioning of transducing head 32 is discussed below with respect to FIGS. 3–7.

Figure 3:
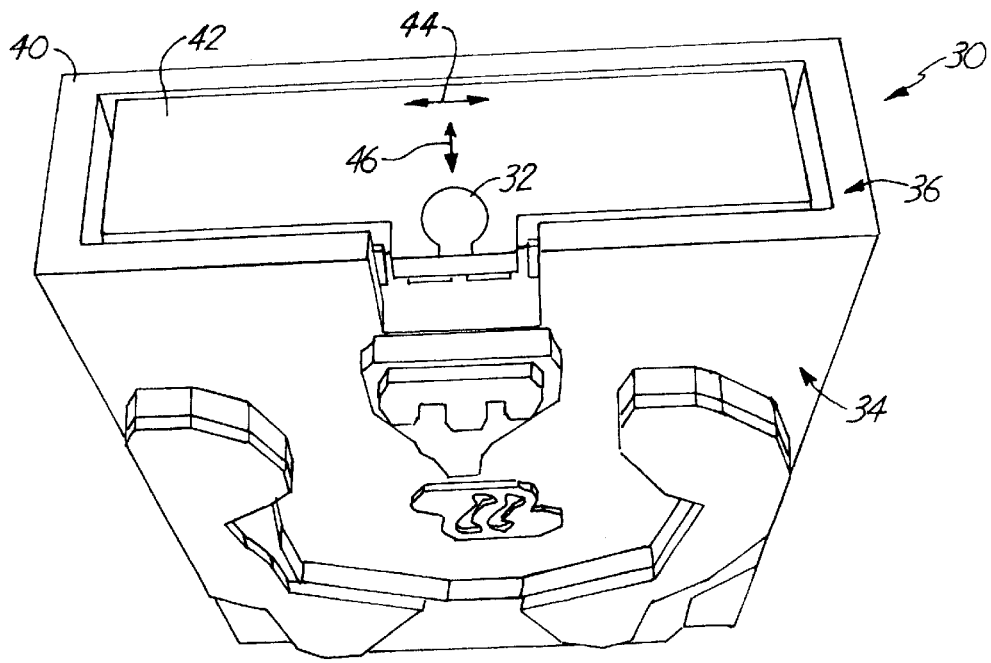
FIG. 3 is a perspective view of the slider assembly of the present invention.

FIG. 3 is a perspective view of slider assembly 30 according to the present invention. Slider assembly 30 has air-bearing surface 34 and trailing edge surface 36, with transducing head 32 being carried on trailing edge surface 36 of slider assembly 30. Slider assembly 30 includes stator portion 40 and rotor portion 42 which carries transducing head 32. Rotor portion 42 is movable with respect to stator portion 40 in a lateral cross-track direction indicated by arrows 44 and in a vertical direction as indicated by arrows 46.

Figure 4:
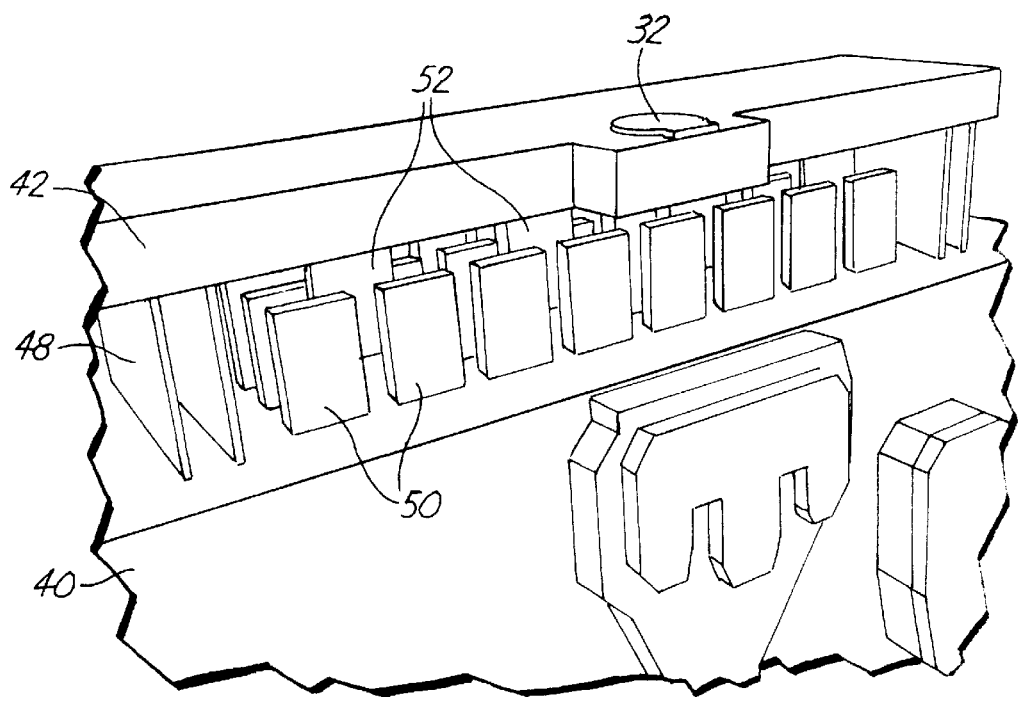
FIG. 4 is a partially cut-away perspective view of the slider assembly of the present invention.

FIG. 4 is a partially cut-away perspective view of slider assembly 30 according to the present invention, showing the arrangement of stator portion 40 and rotor portion 42 in more detail. Stator portion 40 includes a plurality of stator electrodes 50. Rotor portion 42 includes a plurality of rotor electrodes 52. Rotor portion 42 is connected to stator portion 40 by spring assemblies 48, with rotor electrodes 52 being suspended so as to interdigitate with stator electrodes 50 in an electrostatic comb configuration. The electrostatic comb is operable in response to voltage differences between selected ones of stator electrodes 50 and rotor electrodes 52 to generate a force therebetween. By utilizing a two-dimensional array of stator electrodes 50 and rotor electrodes 52 interdigitated therebetween, the forces generated by the electrostatic comb occur in both a lateral direction for microactuation and in a vertical direction for glide height control. These forces cause lateral and/or vertical movement of rotor electrodes 52 with respect to stator electrodes 50, and corresponding lateral and/or vertical displacement of rotor portion 42 with respect to stator portion 40, permitted by the flexibility of spring assemblies 48 in both the lateral and vertical directions. For spring assemblies 48 to have the necessary flexibility on both the lateral (across radial tracks of the disc) and vertical (perpendicular to the disc surface) directions, in an exemplary embodiment spring assemblies 48 are perforated in such a manner as to form a plurality of spring columns with a small cross-sectional circumference. Other variations in the structure of spring assemblies 48 to achieve flexibility in both the lateral and vertical directions are possible.

Figure 5:
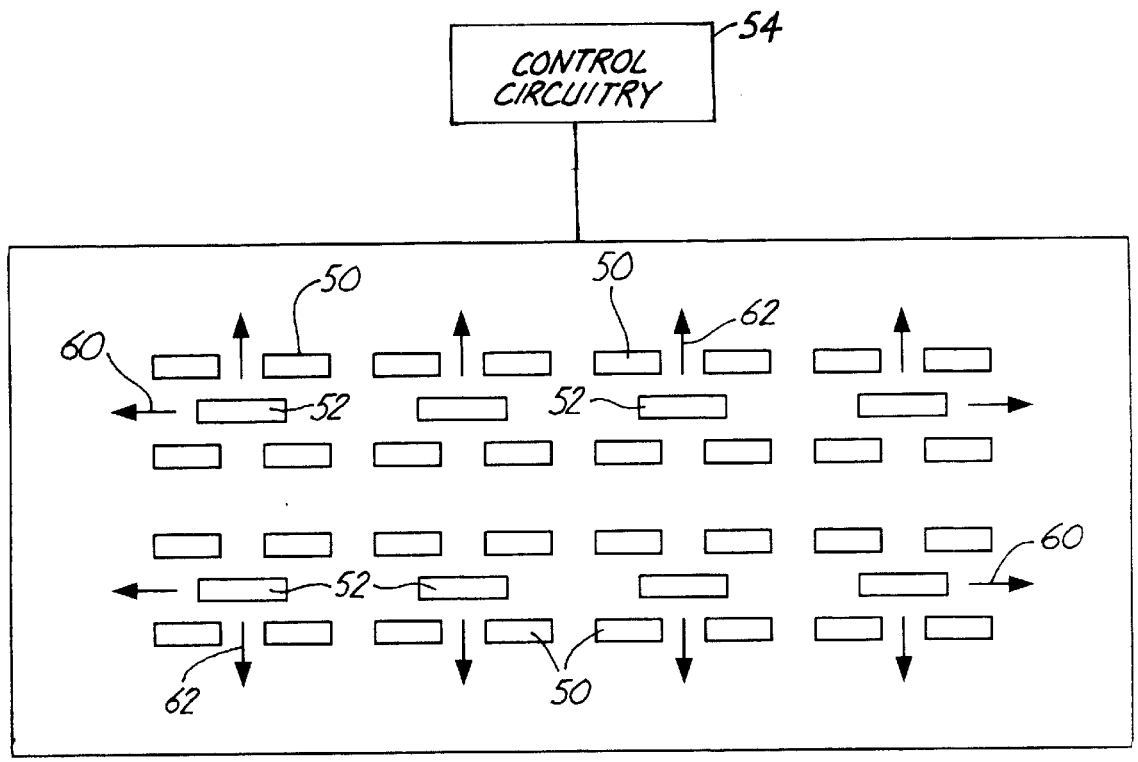
FIG. 5 is a diagram illustrating the operation and movement of the electrodes of the dual-axis microactuator formed in the slider assembly of the present invention.

FIG. 5 is a diagram illustrating the operation and movement of the electrostatic comb configuration formed by stator electrodes 50 and rotor electrodes 52. The voltages applied to stator electrodes 50 and rotor electrodes 52 are controlled by control circuitry 54, which may be implemented in a manner known in the art. In order to understand the forces involved between stator electrodes 50 and rotor electrodes 52, a discussion of the electrostatic principles associated with the operation of the invention is useful. When a voltage difference is applied between stator electrodes 50 and rotor electrodes 52, the voltage difference creates an electrostatic force of attraction therebetween, in the general direction of arrows 62. In addition, a lateral electrostatic force is also created in the direction of arrows 60. The lateral electrostatic force $F_{lat}$ is given by:

$$F_{lat} = \frac{\varepsilon_0 L_e}{2L_g} V^2 \qquad \text{(Eq. 1)}$$

where N is the number of electrically active inter-electrode gaps, $\varepsilon_0$ is the dielectric constant of free space or air ($8.854 \times 10^{-12}$ Farads per meter (F/m)), $L_e$ is the length of the electrodes in meters, $L_g$ is the size of the gap between stator electrodes 50 and rotor electrodes 52 in meters, and V is the voltage difference between stator electrodes 50 and rotor electrodes 52. The normal electrostatic force $F_{norm}$, attempting to pull rotor electrodes 52 toward stator electrodes 50 is given by:

$$F_{norm} = \frac{\varepsilon_0 L_e W_e}{2L_g^2} V^2 \qquad \text{(Eq. 2)}$$

where N is the number of electrically active inter-electrode gaps, $\varepsilon_0$ is the dielectric constant of free space or air ($8.854 \times 10^{-12}$ Farads per meter (F/m)), $L_e$ is the length of the electrodes in meters, $W_e$ is the width of the electrodes in meters, $L_g$ is the size of the gap between stator electrodes 50 and rotor electrodes 52 in meters, and V is the voltage difference between stator electrodes 50 and rotor electrodes 52.

Figure 6:
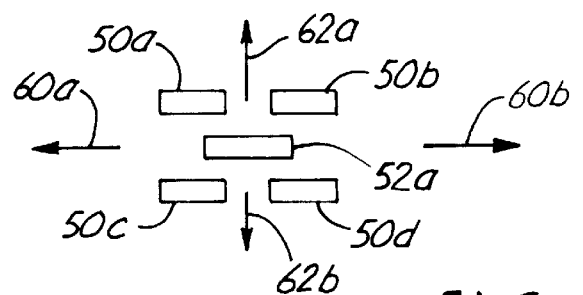
FIG. 6 is a diagram of an individual array segment of the electrodes of the dual-axis microactuator formed in the slider assembly of the present invention.

As shown in FIG. 5, the array of stator electrodes 50 and rotor electrodes 52 is made up of a plurality of array segments that include four stator electrodes 50 around a single stator electrode. In an exemplary embodiment, each of these array segments is operated in an identical manner to achieve the overall movement of the microactuator. FIG. 6 is a diagram of an individual array segment for purposes of illustrating the operation of each segment in the array of stator electrodes 50 and rotor electrodes 52. Rotor electrode 52a is surrounded by stator electrodes 50a, 50b, 50c and 50d. By applying selected voltage patterns to stator electrodes 50a, 50b, 50c and 50d, forced are generated to cause movement of rotor electrode 52a in a selected direction indicated by arrows 60a, 60b, 62a and 62b.

The voltage patterns may be operated in a number of modes to achieve the desired movement. For example, rotor electrode 52a may be held at ground potential, and voltages of a selected polarity may be applied to selected stator electrodes 50a, 50b, 50c and 50d to create a potential difference in the direction of desired motion of rotor electrode 52a. It is possible to increase the force applied to rotor electrode 52a by a factor of four by applying a voltage of one polarity to rotor electrode 52a and applying a voltage of equal magnitude but opposite polarity to the selected stator electrodes 50a, 50b, 50c and 50d, at the cost of increased complexity of control circuitry 54 (FIG. 5). For simplicity of illustration, the following discussion assumes that rotor electrode 52a is permanently held at a ground potential, and that stator electrodes 50a, 50b, 50c and 50d specified to have a low voltage applied thereto are also held at ground potential.

In order to move rotor electrode 52a in the direction of arrow 60a, a high voltage is applied to stator electrodes 50a and 50c, and a low voltage is applied to stator electrodes 50b and 50d. An attractive force is therefore created in the direction of arrow 60a toward stator electrodes 50a and 50c by the voltage difference between rotor electrode 52a and stator electrodes 50a and 50c. No net vertical force is created in the direction of arrows 62a or 62b since there are equal voltages applied to stator electrodes 50a and 50c, and therefore the attractive force in the upward vertical direction in FIG. 6 between rotor electrode 52a and stator electrode 50a is counteracted by an equal but opposite attractive force between rotor electrode 52a and stator electrode 50c in the downward vertical direction.

In order to move rotor electrode 52a in the direction of arrow 60b, a high voltage is applied to stator electrodes 50b and 50d and a low voltage is applied to stator electrodes 50a and 50c. An attractive force is therefore created in the direction of arrow 60b toward stator electrodes 50b and 50d by the voltage difference between rotor electrode 52a and stator electrodes 50b and 50d. No net vertical force is created in the direction of arrows 62a or 62b since the equal magnitude, opposite direction vertical forces between rotor electrode 52a and stator electrodes 50b and 50d counteract one another and cancel each other out.

In order to move rotor electrode 52a in the direction of arrow 62a, a high voltage is applied to stator electrodes 50a and 50b and a low voltage is applied to stator electrodes 50c and 50d. An attractive force is therefore created in the direction of arrow 62a toward stator electrodes 50a and 50b by the voltage difference between rotor electrode 52a and stator electrodes 50a and 50b. No net horizontal force is created in the direction of arrows 60a or 60b since there are equal voltages applied to stator electrodes 50a and 50b, and therefore the attractive force in the left horizontal direction in FIG. 6 between rotor electrode 52a and stator electrode 50a is counteracted by an equal but opposite attractive force between rotor electrode 52a and stator electrode 50b in the right horizontal direction.

In order to move rotor electrode 52a in the direction of arrow 62b, a high voltage is applied to stator electrodes 50c and 50d and a low voltage is applied to stator electrodes 50a and 50b. An attractive force is therefore created in the direction of arrow 62b toward stator electrodes 50c and 50d by the voltage difference between rotor electrode 52a and stator electrodes 50c and 50d. No horizontal force is created in the direction of arrows 60a or 60b since the equal magnitude, opposite direction horizontal forces between rotor electrode 52a and stator electrodes 50c and 50d counteract one another and cancel each other out.

Simultaneous control of both track position (by movement in the direction of arrows 60a and 60b) and flying height (by movement in the direction of arrows 62a and 62b) may be achieved by applying selected voltages to stator electrodes 50a, 50b, 50c and 50d, as well as to rotor electrode 52a. The range of selected voltages applied to rotor electrode 52a and to some but not all of stator electrodes 50a, 50b, 50c and 50d may include zero (ground potential). For example, applying a high (non-zero) voltage to stator electrode 50a only, and applying a low voltage (zero volts) to stator electrodes 50b, 50c and 50d and rotor electrode 52a would result in the creation of an attractive force in both the direction of arrow 60a and the direction of arrow 62a. These forces are due to the voltage difference between rotor electrode 52a and stator electrode 50a. The net movement of rotor electrode 52a would therefore be up (arrow 62a) and to the left (arrow 60a) in the drawing of FIG. 6. Other movement possibilities will be apparent to one skilled in the art by selectively controlling the voltages applied to stator electrodes 50a, 50b, 50c and 50d.

Figure 7:
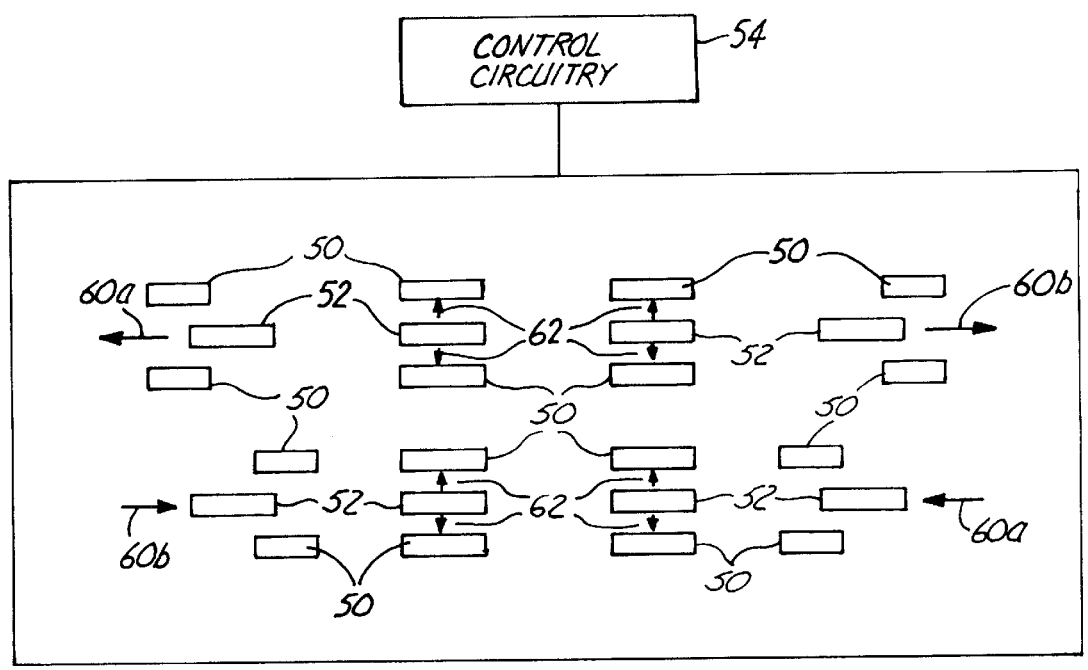
FIG. 7 is a diagram illustrating the operation and movement of the electrodes of the dual-axis microactuator formed in the slider assembly according to another embodiment of the present invention.

FIG. 7 is a diagram illustrating the operation and movement of the electrostatic comb configuration formed by stator electrodes 50 and rotor electrodes 52 configured according to an alternate embodiment of the invention. Again, the voltages applied to stator electrodes 50 and rotor electrodes 52 are controlled by appropriate control circuitry 54. The control of movement of rotor electrodes 52 is potentially simplified in the embodiment shown in FIG. 7 by dedicating particular pairs of stator electrodes 50 to a single dimension of movement. For example, as shown in FIG. 7, the upper left and lower right pairs of stator electrodes 50 may be configured to generate force to move rotor electrodes 52 to the left, as indicated by arrows 60a, and the upper right and lower left pairs of stator electrodes 50 may be configured to generate force to move rotor electrodes 52 to the right, as indicated by arrows 60b. The center four pairs of stator electrodes 50 may be configured to generate forces to move rotor electrodes 52 vertically, as indicated by arrows 62. The configuration of stator electrodes 50 shown in FIG. 7 allows fewer stator electrodes to be employed, and also simplifies the control scheme utilized to generate a desired movement of rotor electrodes 52. Electrical connections to stator electrodes 50 are also simplified by the arrangement shown in FIG. 7.

Figure 8:
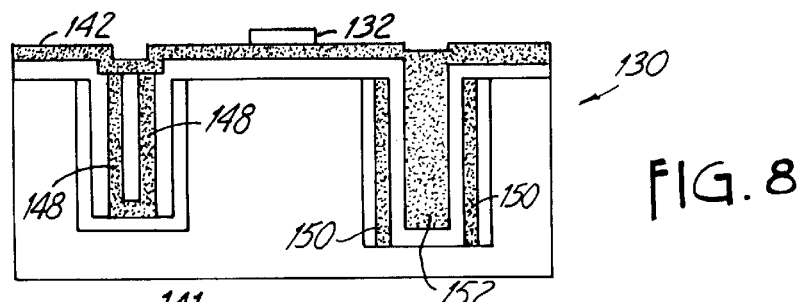
FIGS. 8–24 are two-dimensional layer diagrams illustrating the formation of the slider assembly of the present invention.

An exemplary method of forming the transducer-level microactuator with dual axis control according to the present invention is shown in two-dimensional layer diagrams in FIGS. 8–24. FIG. 8 is a two-dimensional layer diagram illustrating the basic material layers forming completed microactuator 130. Microactuator 130 supports transducing head 132, which is formed on rotor portion 142. Rotor portion 142 is movable with respect to stator portion 140, and is mechanically supported by springs 148. Stator electrodes 150 are formed on stator portion 140, and rotor electrodes 152 extend from rotor portion 142 and are suspended between stator electrodes 150. For the purpose of clarity, rotor portion 142, springs 148, stator electrodes 150 and rotor electrodes 152 are stippled in FIG. 8. The sequential process of forming microactuator 130 is illustrated in more detail in FIGS. 9–24, with the spring formation process shown in FIGS. 9–16 and the electrode fabrication process shown in FIGS. 17–24.

Figure 9:
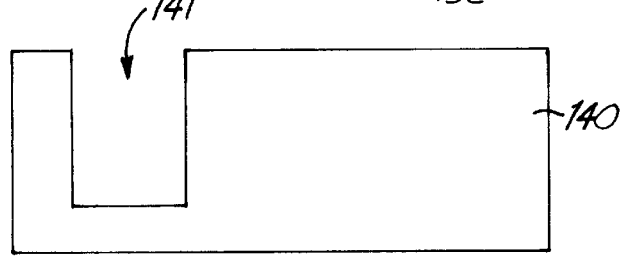

As shown in FIG. 9, stator portion 140 is initially formed from a silicon substrate. Spring cavity 141 is then formed in stator portion 140, by a method known in the art such as appropriate photoresist masking and deep trench reactive ion etching (DTRIE). Other methods for forming spring cavity 141 may also be used.

Figure 10:
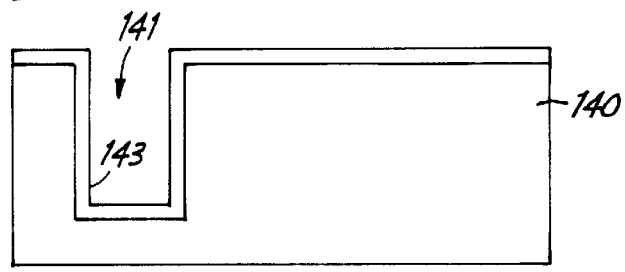

FIG. 10 illustrates the subsequent step of forming insulating layer 143 on stator portion 140 and in spring cavity 141. In an exemplary embodiment, insulating layer 143 is composed of thermal silicon dioxide that is grown on the silicon material of stator portion 140.

Figure 11:
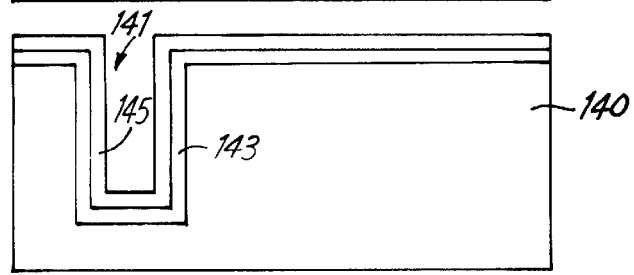

FIG. 11 illustrates the further step of depositing sacrificial layer 145 on insulating layer 143. In an exemplary embodiment, sacrificial layer 145 is composed of a material such as poly-germanium or germanium-rich poly-silicon-germanium, allowing sacrificial layer 145 to be readily etched away while preserving insulating layer 143.

Figure 12:
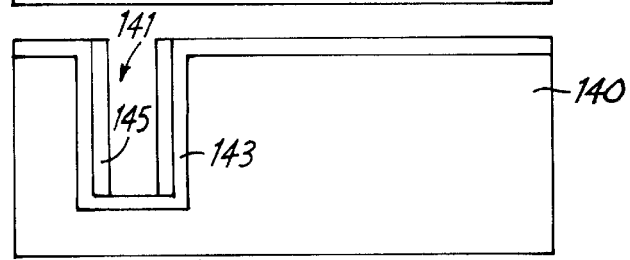

As shown in FIG. 12, the horizontal surfaces of sacrificial layer 145 are removed, leaving only vertical columns of sacrificial layer 145. In an exemplary embodiment, removal of the horizontal surfaces of sacrificial layer 145 is performed by plasma etching or a similar process for targeting only the horizontal surfaces of sacrificial layer 145 for removal.

Figure 13:
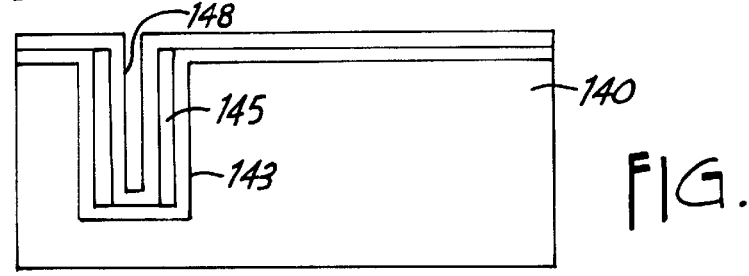

FIG. 13 illustrates the subsequent step of depositing springs 148 on exposed portions of insulating layer 143, abutting the vertical columns of sacrificial layer 145. In an exemplary embodiment, springs 148 are composed of doped poly-silicon, and are deposited by a low pressure chemical vapor deposition (LPCVD) process, as is known in the art. Springs 148 may alternatively be composed of tungsten, molybdenum or some other material of suitable electrical and mechanical properties that may be deposited by LPCVD or another conformal deposition process. Metals such as tungsten and molybdenum exhibit higher conductivity than poly-silicon, and may be desirable for application in which such higher conductivity is beneficial. Other metals may also be appropriate.

Figure 14:
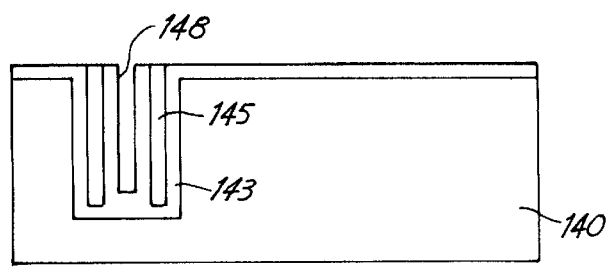

As shown in FIG. 14, the material forming springs 148 is removed from the top surface of the microactuator, such as by an etching process. This step leaves only the desired shape of springs 148.

Figure 15:
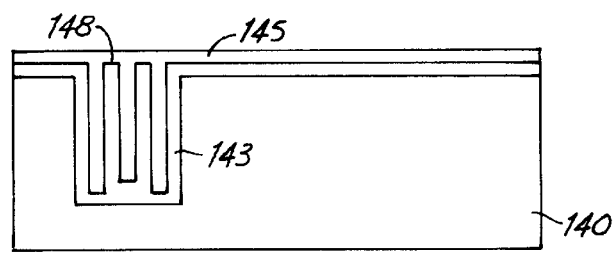

FIG. 15 illustrates the subsequent step of depositing additional sacrificial material over the exposed portions of insulating layer 143 and springs 148, and in the interior portion of springs 148. This additional material adjoins the previously deposited sacrificial material to form conformal sacrificial layer 145.

Figure 16:
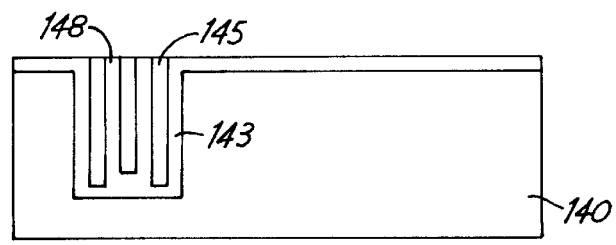

As shown in FIG. 16, the horizontal surfaces of sacrificial layer 145 are removed, leaving vertical columns of sacrificial layer 145 around and between springs 148. In an exemplary embodiment, removal of the horizontal surfaces of sacrificial layer 145 is performed by plasma etching or a similar process for targeting only the horizontal surfaces of sacrificial layer 145 for removal.

Figure 17:
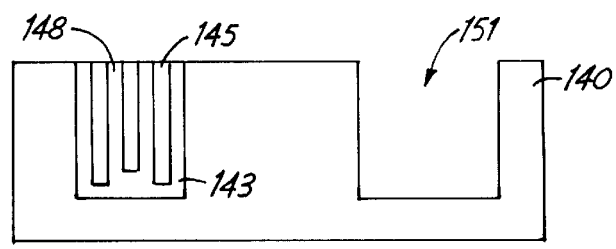

As shown in FIG. 17, stator electrode cavity 151 is formed in stator portion 140 in order to form the stator electrodes of the microactuator. Stator electrode cavity 151 is formed by a method known in the art such as appropriate photoresist masking and deep trench reactive ion etching (DTRIE). Other methods for forming stator electrode cavity 151 may also be used.

Figure 18:
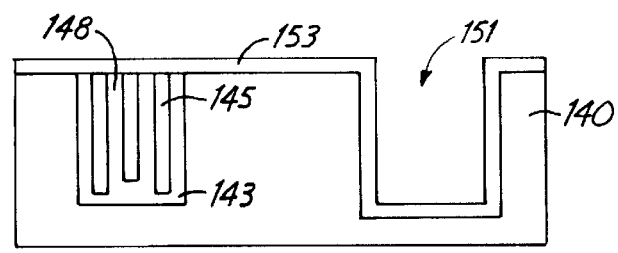

FIG. 18 illustrates the subsequent step of forming insulating layer 153 on stator portion 140, over springs 148 and in stator electrode cavity 151. In an exemplary embodiment, insulating layer 153 is composed of thermal silicon dioxide that is grown on stator portion 140 and in stator electrode cavity 151.

Figure 19:
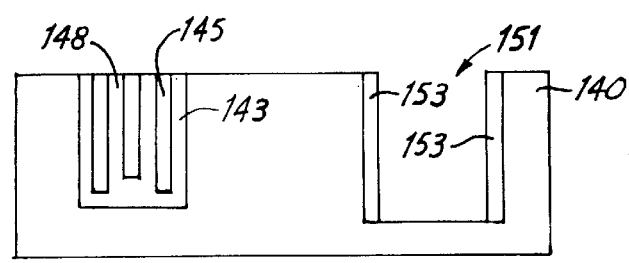

As shown in FIG. 19, the horizontal surfaces of insulating layer 153 are removed, leaving vertical columns of insulating layer 153 on the side walls of stator electrode cavity 151. In an exemplary embodiment, removal of the horizontal surfaces of insulating layer 153 is performed by plasma etching or a similar process for targeting only the horizontal surfaces of insulating layer 153 for removal.

Figure 20:
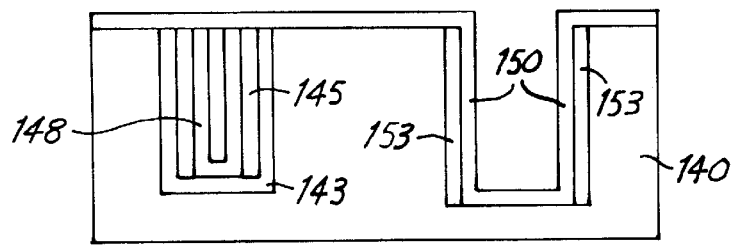

FIG. 20 illustrates the subsequent step of depositing stator electrodes 150 on the exposed portions of stator portion 140 and abutting the columns of insulating layer 153. In an exemplary embodiment, stator electrodes 150 are composed of doped poly-silicon, and are deposited by a LPCVD process.

Figure 21:
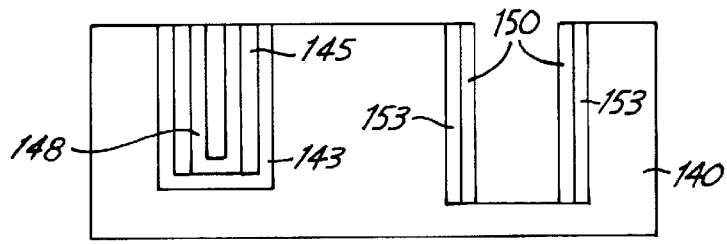

As shown in FIG. 21, the material forming stator electrodes 150 is removed from the horizontal surfaces of the microactuator, such as by an isotropic etching process which etches significantly faster in the vertical direction than the horizontal direction. This step leaves only the desired shape of stator electrodes 150.

Figure 22:
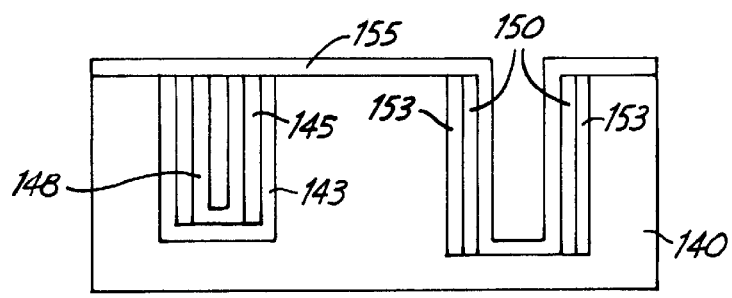

FIG. 22 illustrates the subsequent step of depositing sacrificial layer 155 on the top surface of the microactuator and in stator electrode cavity 151 between stator electrodes 150. In an exemplary embodiment, sacrificial layer 155 is composed of a material such as poly-germanium or germanium-rich poly-silicon-germanium, allowing sacrificial layer 155 to be readily etched away while preserving the other layers of the microactuator.

Figure 23:
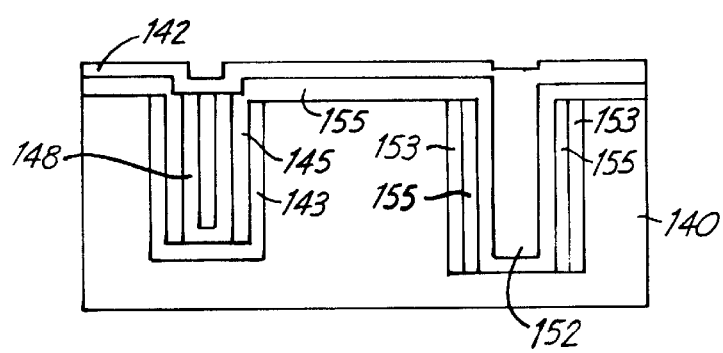

FIG. 23 illustrates the step of depositing rotor portion 142 to interact with stator portion 140 and the associated stator features of the microactuator. Cavities are initially formed in sacrificial layer 155 for mechanical attachment of rotor portion 142 to spring 148 and to allow formation of rotor electrodes 152. Rotor portion 142 is then formed by deposition of a material such as doped poly-silicon, forming the main part of rotor portion and suspending rotor electrodes 152 between stator electrodes 150.

Figure 24:
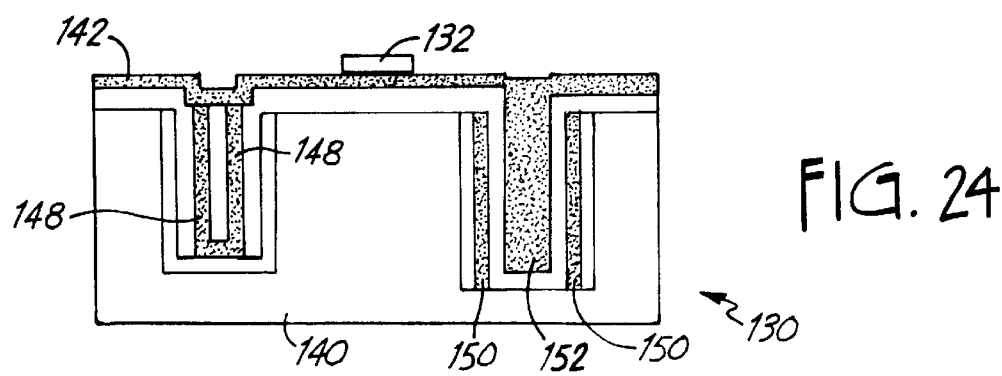

Finally, sacrificial layers 145 and 155 are removed and transducing head 132 is formed on rotor portion 142, yielding completed microactuator 130 as shown in FIG. 24. In an exemplary embodiment, sacrificial layers 145 and 155 are removed by a hydrogen peroxide bath or by a similar method known in the art, releasing springs 148 and forming an air gap between stator electrodes 150 and rotor electrodes 152. For the purpose of clarity, and to better illustrate the air gap between components, rotor portion 142, springs 148, stator electrodes 150 and rotor electrodes 152 are stippled in FIG. 24.

The present invention provides a transducer-level microactuator that permits both the radial track position and the flying height to be controlled with a high resonant frequency. A rotor portion of the slider, having a small mass compared to the overall mass of the slider, carries the transducing head. A stator portion of the slider includes a plurality of stator electrodes, and the rotor portion is flexibly supported by the stator portion so that at least one rotor electrode is suspended adjacent to the stator electrodes. Application of a voltage difference between selected stator electrodes and rotor electrodes causes an electrostatic force of attraction between the selected electrodes, so that the rotor portion is forced to move in a selected direction with respect to the stator portion of the slider. As a result, both high resolution radial track positioning and precise flying height control may be performed by the dual-axis microactuator of the present invention.

Although the present invention has been described with reference to preferred embodiments, workers skilled in the art will recognize that changes may be made in form and detail without departing from the spirit and scope of the invention.

What is claimed is:

1. A slider for carrying and finely adjusting both a radial position and a flying height of a transducing head with respect to a track of a rotatable disc having a plurality of concentric tracks in a disc drive system, the slider comprising:

a stator portion carried by a flexure;

a plurality of springs extending from the stator portion, the springs being flexible in a lateral direction and in a vertical direction;

a rotor portion connected to the stator portion by the plurality of springs, the rotor portion carrying the transducing head and being separated from the stator portion by a gap region;

a plurality of stator electrodes on the stator portion extending into the gap region;

a plurality of rotor electrodes on the rotor portion extending into the gap region and suspended so as to interdigitate with the stator electrodes in an electrostatic array configuration in which a two-dimensional array of stator electrodes are arranged around each rotor electrode in the gap region; and control circuitry for applying selected voltages to the stator electrodes and the rotor electrodes to create a selected force upon each rotor electrode in both the lateral and vertical directions for moving the rotor portion with respect to the stator portion to finely adjust the radial position and flying height of the transducing head.

2. The slider of claim 1, wherein the two-dimensional array of stator electrodes arranged around each rotor electrode comprises four stator electrodes arranged with the rotor electrode therebetween.

3. The slider of claim 1, wherein the springs are composed of doped poly-silicon.

4. The slider of claim 1, wherein the springs are composed of a metal.

5. The slider of claim 4, wherein the metal is selected from a group consisting of tungsten and molybdenum.

6. The slider of claim 1, wherein the stator electrodes and the rotor electrodes are composed of doped poly-silicon.

7. A disc drive having a recording disc rotatable about an axis, a slider carrying a transducing head for transducing data with the disc, and a support structure supporting the slider and operable to coarsely position the transducing head adjacent to a selected radial track of the disc, the slider comprising:

a stator portion carried by the support structure;

a plurality of springs extending from the stator portion, the springs being flexible in a lateral direction and in a vertical direction;

a rotor portion connected to the stator portion by the plurality of springs, the rotor portion carrying the transducing head and being separated from the stator portion by a gap region;

a plurality of stator electrodes on the stator portion extending into the gap region;

a plurality of rotor electrodes on the rotor portion extending into the gap region and suspended so as to interdigitate with the stator electrodes in an electrostatic array configuration in which a two-dimensional array of stator electrodes is arranged around each rotor electrode in the gap region; and control circuitry for applying selected voltages to the stator electrodes and the rotor electrodes to create a selected force upon each rotor electrode in both the lateral and vertical directions for moving the rotor portion with respect to the stator portion to finely adjust the radial position and flying height of the transducing head.

8. The disc drive of claim 7, wherein the two-dimensional array of stator electrodes arranged around each rotor electrode comprises four stator electrodes arranged with the rotor electrode therebetween.

9. The disc drive of claim 7, wherein the springs are composed of doped poly-silicon.

10. The disc drive of claim 7, wherein the stator electrodes and the rotor electrodes are composed of doped poly-silicon.

11. A method of forming a slider for carrying and finely adjusting both a radial position and a flying height of a transducing head with respect to a track of a rotatable disc having a plurality of concentric tracks in a disc drive system, the method comprising:

forming a stator portion of the slider in a substrate;

forming a spring cavity in the stator portion;

forming a first insulating layer on the stator portion and in the spring cavity;

depositing a first sacrificial layer on the first insulating layer;

removing horizontal surfaces of the first sacrificial layer;

forming springs on the first insulating layer in the spring cavity;

depositing a second sacrificial layer around the springs;

forming a stator electrode cavity in the stator portion;

forming a second insulating layer on the stator portion, over the springs and in the stator electrode cavity;

removing horizontal surfaces of the second insulating layer;

forming stator electrodes in the stator electrode cavity;

depositing a third sacrificial layer between the stator electrodes;

forming a rotor portion that is attached to the springs and includes at least one rotor electrode suspended between the stator electrodes, configured with a two-dimensional array of stator electrodes around each rotor electrode;

forming the transducing head on the rotor portion; and removing the first, second and third sacrificial layers.

12. The method of claim 11, wherein the steps of forming the springs, forming the stator electrodes and forming the rotor portion comprise depositing doped poly-silicon by a low pressure chemical vapor deposition process.

13. The method of claim 11, wherein the steps of forming the spring cavity and forming the stator electrode cavity comprise reactive ion etching in the stator portion.

14. The method of claim 11, wherein the steps of depositing the first, second and third sacrificial layers comprise depositing a material selected from a group consisting of poly-geranium and germanium-rich poly-silicon-germanium.

15. The method of claim 11, wherein the steps of forming the first and second insulating layers comprise growing thermal silicon dioxide.

* * * * *

UNITED STATES PATENT AND TRADEMARK OFFICE
CERTIFICATE OF CORRECTION

PATENT NO. : 6,785,086 B1
DATED : August 31, 2004
INVENTOR(S) : Wayne A. Bonin et al.

It is certified that error appears in the above-identified patent and that said Letters Patent is hereby corrected as shown below:

Column 4,
Lines 41-47, Equation 1, delete " $F_{lat} = \dfrac{\varepsilon_0 L_e}{2 L_g} V^2$ ", insert -- $F_{lat} = N \dfrac{\varepsilon_0 L_e}{2 L_g} V^2$ --

Lines 55-60, Equation 2, delete " $F_{norm} = \dfrac{\varepsilon_0 L_e W_e}{2 L_g^2} V^2$ , insert -- $F_{norm} = N \dfrac{\varepsilon_0 L_e W_e}{2 L_g^2} V^2$ --

Signed and Sealed this

Fifteenth Day of March, 2005

JON W. DUDAS
*Director of the United States Patent and Trademark Office*